United States Patent [19]

Peek

[11] Patent Number: 5,197,840
[45] Date of Patent: Mar. 30, 1993

[54] INSULATION RETAINER

[75] Inventor: Brian R. Peek, Mokena, Ill.

[73] Assignee: Illinois Tool Works Inc., Glenview, Ill.

[21] Appl. No.: 680,083

[22] Filed: Apr. 3, 1991

[51] Int. Cl.[5] .............................................. F16B 37/08
[52] U.S. Cl. .................................. 411/433; 411/437; 411/508
[58] Field of Search ............... 411/433, 437, 338, 908, 411/366, 512, 180, 182, 181, 429, 508, 509, 510

[56] References Cited

U.S. PATENT DOCUMENTS

| | | | |
|---|---|---|---|
| 2,111,267 | 3/1938 | Hoppenstand | 411/338 |
| 4,571,136 | 2/1986 | Peek | 411/437 |
| 4,770,582 | 9/1988 | Junemann et al. | 411/182 |
| 4,826,379 | 5/1989 | Norden | 411/366 |
| 4,830,560 | 5/1989 | Hirohata | 411/433 |
| 4,850,778 | 7/1989 | Clough et al. | 411/433 |

FOREIGN PATENT DOCUMENTS 447470  1/1913  France ................................. 411/399
150816  9/1920  United Kingdom ................ 411/427

Primary Examiner—Rodney M. Lindsey
Attorney, Agent, or Firm—Schwartz & Weinrieb

[57] ABSTRACT

An insulation retainer is provided for mounting upon the threads of a threaded stud so as to retain insulation of various thicknesses upon a substrate to which the stud is attached. The insulation retainer includes an outer body member and an inner body member. Adjustment means are formed upon the interior surface of the outer body member and upon the exterior surface of the inner body member so as to permit ratcheting of the outer body member over the inner body member in small increments so as to accommodate various thicknesses of insulation to be retained upon the substrate.

20 Claims, 2 Drawing Sheets

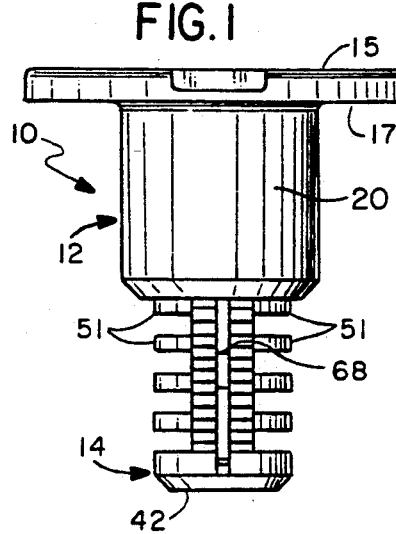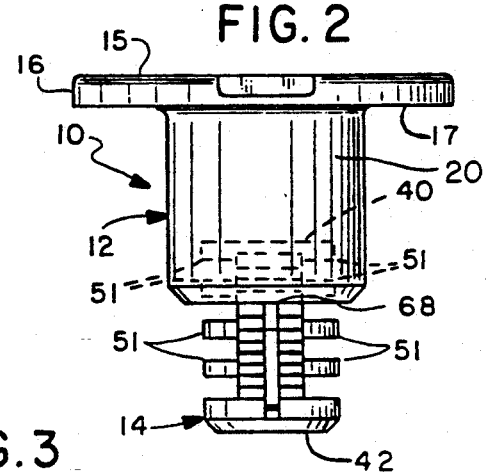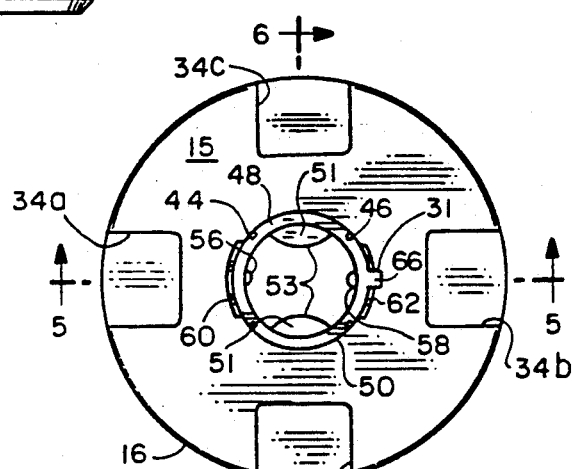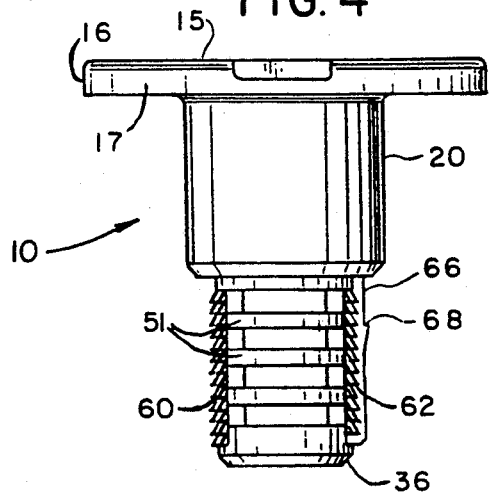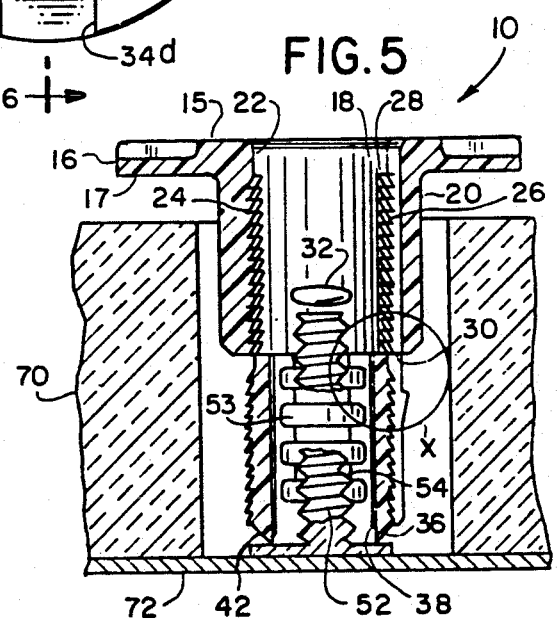

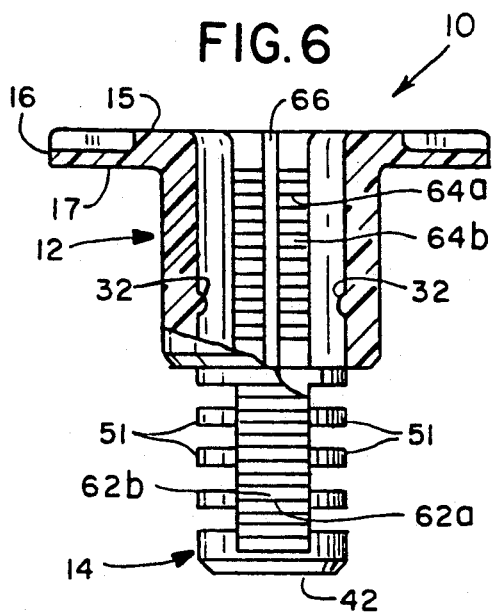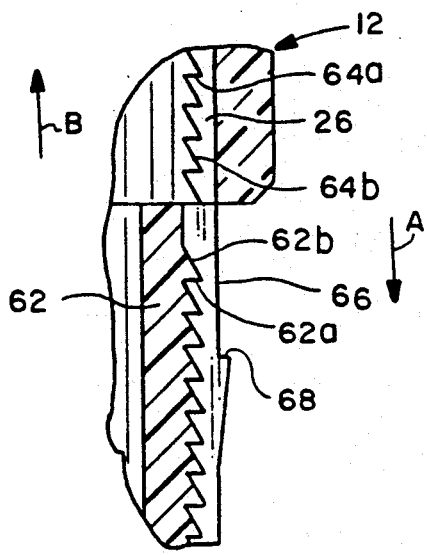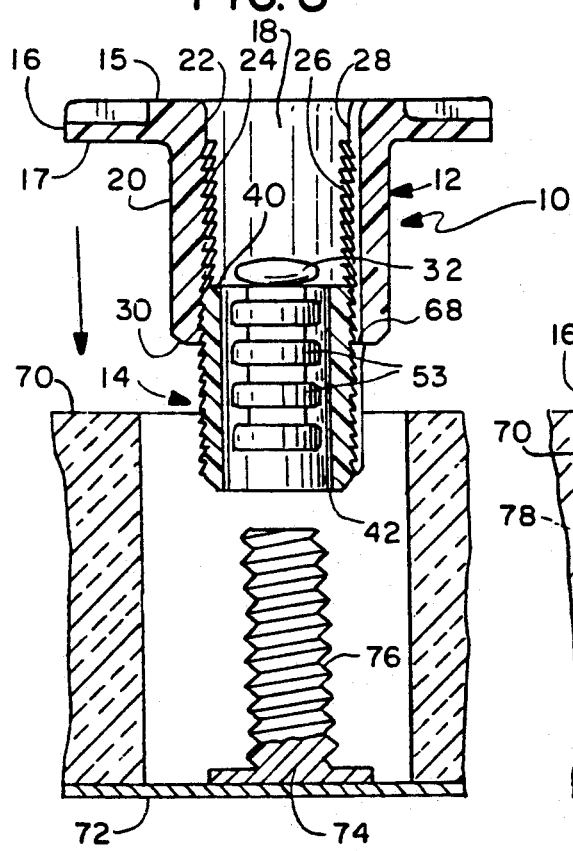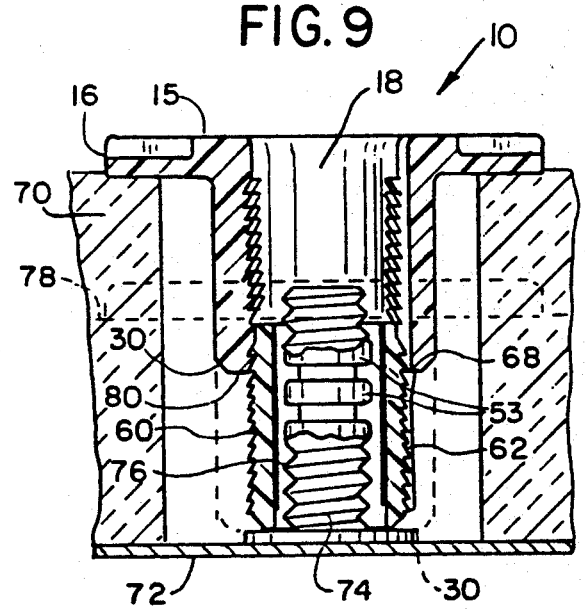

INSULATION RETAINER

FIELD OF THE INVENTION

This invention relates generally to push-on type fastener devices and more particularly, it relates to an improved insulation retainer of the push-on type which comprises an outer body member, an inner body member, and means for adjusting the movement of the outer body member relative to the inner body member so as to accommodate various thicknesses of insulation to be secured to a substrate.

BACKGROUND OF THE INVENTION

As is generally well known in the art, there are various fastener devices of the push-on type which can be quickly installed upon a threaded stud but yet are required to be unscrewed with respect to the threaded studs in order to remove the fastener devices from the threaded studs. For example, in U.S. Pat. No. 4,571,136 to Brian R. Peek, wherein the disclosed invention was invented by the same inventor and assigned to the same assignee as the present invention, there is disclosed a one-piece plastic fastener which is designed to be pushed onto a threaded stud. The fastener includes a head portion and a generally axially extending cylindrical body portion. The cylindrical body portion is formed with a pair of diametrically opposed rib sections which extend the length of the body portion with the rib sections having equally spaced arcuate segments. Within the interior of the cylindrical body portion, a resilient wing member is integrally formed inwardly of the arcuate segments. A pair of longitudinally extending narrow ridges are also formed upon the interior of the body portion with a thickness selected so as to cause the resilient wing members to be brought into threaded engagement with the threaded stud as the fastener is pushed onto the stud.

The present invention represents a significant improvement over U.S. Pat. No. 4,571,136 which is incorporated herein by reference. In the present invention, there is provided an improved insulation retainer of the push-on type which comprises an outer body member, an inner body member, and means for adjusting the movement of the outer body member relative to the inner body member so as to accommodate various thicknesses of insulation to be secured to a substrate.

OBJECTS OF THE INVENTION

Accordingly, it is a general object of the present invention to provide an improved insulation retainer of the push-on type which is relatively simple and economical to manufacture and use.

It is another object of the present invention to provide an improved insulation retainer of the push-on type which may be formed of a plastic material by means of an injection molding process.

It is another object of the present invention to provide an improved insulation retainer which may be quickly installed without requiring the use of tools and which can be removed by unscrewing the same so as to permit reusability thereof.

It is another object of the present invention to provide an improved insulation retainer of the push-on type which comprises an outer body member, an inner body member, and means for adjusting the movement of the outer body member relative to the inner body member so as to accommodate various thicknesses of insulation to be secured to a substrate.

SUMMARY OF THE INVENTION

In accordance with these aims and objectives, the present invention is concerned with the provision of an improved insulation retainer adapted for mounting upon the threads of a threaded stud so as to retain insulation of various thicknesses upon a substrate. The insulation retainer includes an outer body member and an inner body member. The outer body member has a head portion and a shank portion. The head portion is formed with a front surface and a back surface and has a central opening. The shank portion extends axially from the back surface of the head portion and has an inner body receiving bore which is with the central opening defined within the head portion. The inner body member is formed of a cylindrical body portion and has a threaded element receiving bore extending between an upper open end and a lower open end. The inner body member is telescoped within the outer body member so that the threaded element receiving bore is disposed coaxially with the inner body receiving bore of the shank portion of the outer body member.

The cylindrical body portion of the inner body member has a pair of diametrically opposed resilient web sections. Each of the web sections includes a plurality of axially spaced-apart arcuate-shaped wing members extending between the upper and lower ends of the inner body member. Each of the arcuate-shaped wing members has its opposite ends thereof formed integrally with an axially extending cylindrical wall section. The cylindrical body portion has retaining means formed internally thereof for ratcheting over the threads of the threaded stud when the retainer is being pressed onto the stud and for thereafter threadingly engaging the threads thereof. Adjustment means are formed upon the interior surface of the shank portion of the outer body member and upon the exterior surface of the cylindrical wall sections of the inner body member for permitting axial movement of the outer body member relative to the inner body member in a first axial direction and for preventing relative axial movement thereof in a second opposite axial direction. As a result, multiple engagement points provide small increments of adjustment of the outer body member with respect to the inner body member for accommodating various thickness of insulation to be retained upon a substrate to which the threaded stud is secured.

BRIEF DESCRIPTION OF THE DRAWING

These and other objects and advantages of the present invention will become more fully apparent from the following detailed description when read in conjunction with the accompanying drawings in which like reference numerals indicate corresponding parts throughout the several views, and wherein:

FIG. 1 is a side elevational view of an insulation retainer, constructed in accordance with the principles of the present invention and illustrated in its initial finished molded condition;

FIG. 2 is a side elevational view similar to FIG. 1, but illustrating the insulation retainer in its pre-driven position;

FIG. 3 is a top plan view of the insulation retainer of the present invention;

FIG. 4 is a front elevational view of the insulation retainer;

FIG. 5 is a cross-sectional view, taken along the lines 5—5 of FIG. 3 and illustrating the retainer being used to retain insulation against the firewall of an automobile;

FIG. 6 is a cross-sectional view, taken along the lines 6—6 of FIG. 3;

FIG. 7 is an enlarged view of the encircled area X of FIG. 5;

FIG. 8 illustrates the initial condition of insertion when the retainer is used to secure an insulation pad; and FIG. 9 illustrates the fully assembled condition of the retainer, with a thinner insulation pad being shown in dotted lines.

DESCRIPTION OF THE PREFERRED EMBODIMENT

Referring now in detail to the various view of the drawings, there is shown an improved insulation retainer 10 constructed in accordance with the principles of the present invention. In FIG. 5 of the drawings the insulation retainer 10 is shown in association with a threaded stud extending from the firewall of an automobile for retaining an insulation pad of predetermined thickness therebetween. However, it is to be distinctly understood that this is not to serve as a limitation upon the scope or teaching thereof, but merely for the purpose of convenience of illustration of one example of its application. The present invention has numerous applications in other fields and apparatus since the invention pertains to an improved insulation retainer which may be quickly secured onto a threaded stud and may be unscrewed therefrom for re-use thereof.

In FIG. 1, there is shown the insulation retainer 10 in its initial completed or finished molded condition. The retainer 10 is preferably formed as a unitary structure which is manufactured from a resilient plastic material or the like through means of a conventional process such as, for example, injection molding. The retainer 10 includes an outer body member 12 and an inner body member 14 telescopically received within the outer body member. After being molded as shown in FIG. 1, the inner body member 14 is pushed further upwardly and inwardly into the interior of the outer body member 12 so as to define a pre-driven position as illustrated in FIG. 2.

Referring now to FIGS. 3-7 of the drawings, the outer body member 12 has a flange or head portion 16 which has a generally flat, circular configuration. However, it should be apparent to those skilled in the art that the head portion 16 may be rectangular, square, or have any other configuration rather than the round configuration shown in the drawings. The head portion 16 has a flat front surface 15 and a flat back surface 17. The head portion 16 also has a central opening 18.

The outer body member 12 has a cylindrically-shaped shank portion 20 extending axially downwardly from the back surface 17 of the head portion 16. The shank portion further includes an inner body receiving bore 22 which is aligned for communication with the central opening 18. Upon the interior surface of the cylindrically-shaped shank portion, there is provided a first section 24 of partial screw threads and a second section 26 of partial screw threads disposed diametrically opposite the first section. Each of the screw threads upon the first and second sections extend axially between first open end 28 adjacent the head portion and second open end 30. In the intermediate area of the second section 26 of partial screw threads, there is formed an axially extending groove or recess 31, as seen in FIG. 3, which serves to prevent rotational movement of the outer body member 12 relative to the inner body member 14 during unscrewing and removal of the retainer, as will be presented herein.

The interior surface of the shank portion 20 is also formed with a pair of diametrically opposed, raised projections 32, as best seen in FIG. 6, which are disposed perpendicular to the first and second sections 24, 26. The raised projections 32 serve as pre-driven stop means for initially limiting the inward movement of the inner body member 14 relative to the outer body member 12. The head portion 16 is also formed with substantially rectangularly-shaped depressions or recesses 34a and 34b which are disposed diametrically opposite each other for receiving fingers of a user or portions of a tool so as to facilitate the unscrewing and removal of the retainer for reuse. In addition, recesses 34c and 34d are formed similar to the recesses 34a and 34b and are disposed diametrically opposite each other. It will be noted that the recesses 34a and 34b are arranged perpendicularly to the recesses 34c and 34d.

The inner body member 14 has a generally cylindrical tubular body portion 36 with a threaded element receiving bore 38 extending between its upper open end 40 and lower open end 42. The receiving bore 38 is disposed coaxially with respect to the axial bore 22 of the shank portion 20. The cylindrical body portion 36 has two diametrically opposed axially extending cylindrical wall sections 44 and 46 which are interconnected by means of diametrically opposed resilient web sections 48 and 50. Each of the web sections comprises a plurality of spaced apart arcuate-shaped wing members 51 extending between the upper and lower ends 40, 42. Each of the plurality of wing members 51 has a finger 53 formed integrally therewith and extending radially inwardly with respect thereto so as to define retaining means for engaging and holding the retainer 10 onto a welded threaded stud 52 due to its threaded engagement with the threads 54 of the stud.

The retaining means further includes diametrically opposed rib members 56 and 58 which are integrally formed upon the inner surface of the respective cylindrical wall sections 44 and 46 and extend in a generally axial direction. The thicknesses of the rib members are selected so as to cause the wing members 51 to be brought into engagement with the threads 54 of the threaded stud 52 as the retainer is pushed onto the threaded stud. Upon the first removal of the retainer from the threaded stud 52, complementary threads are cut within the surfaces of the rib members 56 and 58. Alternatively, the rib members may already be provided with threaded surfaces. Each of the arcuate-shaped wing members 51 are equally spaced a predetermined vertical distance from each other so as to maintain threaded engagement with the threads of the stud, as seen from FIG. 5. The web sections being of a resilient or flexible nature will be caused to ratchet over the threads of the stud as the retainer is initially pushed onto the stud. This ratcheting action will cause the fingers 53 to be brought into threaded engagement with the threads of the stud. The insertion force is low and can be adjusted by changing the interference defined between the fingers 53 and the rib members 56, 58 disposed upon the inside of the inner body member 14.

Furthermore, the pull-off force will be high and is also determined by means of the interference defined between the fingers and the rib members.

Upon the outer surfaces of the cylindrical wall sections 44 and 46 of the inner body member 14, there are provided identical partial screw thread portions 60 and 62, respectively. As can be seen from FIG. 7, the threads of the portion 62 each include a horizontal face 62a and an inclined face 62b. The threads of the second section 26 of the partial screw threads disposed upon the internal surface of the shank portion of the outer body member 12 each include a horizontal face 64a and an inclined face 64b. The threads of the first section 24 are formed in an identical manner as those of the second section 26. The pitch of the inclined face 62b and the pitch of the inclined face 64b are angled so as to permit axial sliding movement of the outer body member 12 relative to the inner body member in the axial direction of the arrow A and prevents movement thereof in the opposite axial direction of the arrow B.

In the intermediate area of the threaded portion 62, there is provided an axially extending ridge 66 which is adapted to be received within the groove 31 formed within the intermediate area of the second section 26 of the partial screw threads. The ridge 66 serves to prevent rotation of the outer body member relative to the inner body member during unscrewing of the retainer from the stud. The ridge 66 has an outwardly extending shoulder or small step 68 functioning as a preset stop for engaging the second opened face end 30 of the outer body member and for initially limiting the downward movement thereof so as to define a pre-driven position of the outer body member.

With attention directed to FIGS. 8 and 9, there is illustrated one practical application of the insulation retainer 10 which is used to secure an insulation retainer 10 which is used to secure an insulation pad 70 to a working surface 72, such as, for example, an automobile firewall formed of sheet metal, which has a welded upstanding threads stud 74. It is assumed that the retainer has already been pre-driven to the required height, as shown in FIG. 2, wherein the raised projections 32 abut against the upper open end 40 of the inner body member 14. First, the lower opened end 42 of the inner body member 14 is inserted over the free end of the stud 74 and then the retainer is pushed in one motion in the direction toward the working surface 72. During the advance of the retainer relative t the stud, the fingers 53 upon the resilient web sections 48, 50 will ride over the opposed screw threads 76 of the stud. This will permit the retainer to continue its advance until the lower opened end 42 of the inner body member collides with the working surface 72. Now, the fingers 53 upon the respective web sections 48, 50 will be disposed in threaded engagement with the threads of the stud. This condition is illustrated in FIG. 9, wherein the insulation pad 70 having the maximum allowable thickness is secured between the head portion 16 and the working surface 72.

In order to accommodate various thicknesses of the insulation pad 70, inclined faces 64b of the outer body member and the inclined faces 62b of the inner body member provide multiple engagement points for permitting the outer body member to slide downwardly against the insulation pad 70. For example, when the insulation pad having a minimum thickness, such as, for example, as indicated by means of the dotted line 78, the outer body member can be pushed further toward surface 72 so as to cause the outer member to ratchet down in small increments upon the several pitches of the screw threaded upon the threaded portions 60 and 62 until the annular surface 80 upon the opened end 30 of the shank portion is initially stopped by means of the step 68. This amount of travel is referred to as the pre-drive length. Due to the resilient nature of the ridge 66, the outer body member can be pushed downwardly still further so as to continue its advancement until the inner body member is completely telescoped within the outer body member. As can be seen, this occurs when the second end 30 of the outer body member collides with the working surface 72.

The retainer 10 may be removed from the stud 74 for reusability and servicing of the insulation pad 70 by unscrewing the same from the threads 76 of the stud. As previously mentioned, the multiple recesses 34a–34d defined within the head portion 16 of the outer body member is used to receive an operator's fingers or a portion of a tool so as to facilitate the removal of the retainer from the stud. During this removal process, the ridge 66 and the inclined faces 62b upon the partial threaded screw portion 62 will prevent the outer member from rotating about the inner body member.

From the foregoing detailed description, it can thus be seen that the present invention provides an improved insulation retainer adapted for mounting upon the threads of a threaded stud so as to retain insulation of various thicknesses upon a substrate. The insulation retainer includes an outer body member and an inner body member. Adjustment means are formed upon the interior surface of the outer body member and upon the exterior surface of the inner body member so as to permit ratcheting of the outer body member over the inner body member in small increments so as to accommodate various thicknesses of insulation to be retained upon the substrate.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An insulation retainer adapted for mounting upon the threads of a threaded stud so as to retain insulation of various thicknesses upon a substrate to which said stud is secured, comprising:

an outer body member including a head portion and a shank portion;

said head portion being formed with a front surface and a back surface and having a central opening defined therethrough;

said shank portion extending axially from said back surface of said head portion and having an inner body receiving bore which is in communication with said central opening defined within said head portion;

an inner body member comprising a cylindrical body portion and having a threaded element receiving bore extending between an upper open end and a lower open end, said inner body member being telescoped within said outer body member so that said threaded element receiving bore is disposed coaxially with respect to said inner body member receiving bore of said shank portion;

said cylindrical body portion of said inner body member having a pair of diametrically opposed resilient web sections, each of said web section comprising a plurality of spaced apart arcuate-shaped wing members extending between said upper and lower ends of said cylindrical body portion, each of said arcuate-shaped wing members having its opposite ends thereof formed integrally with an axially extending cylindrical wall section;

said cylindrical body portion of said inner body member also having retaining means formed internally thereof for ratcheting over said threads of said threaded stud when said retainer is being pressed onto said stud and thereafter threadingly engaging said threads thereof; and adjustment means formed upon an interior surface portion of said shank portion of said outer body member and upon exterior surface portions of said cylindrical wall sections of said inner body member for permitting axial movement of said outer body member relative to said inner body member in a first axial direction and for preventing relative axial movement thereof in a second opposite axial direction, whereby multiple engagement points are provided for allowing small increments of adjustment of said outer body member in a sliding mode downwardly upon said inner body member for accommodating various thicknesses of said insulation to be secured to said substrate.

2. An insulation retainer as claimed in claim 1, wherein:

said adjustment means comprises partial thread screw sections formed upon said interior surface portion of said shank portion and partial screw portions formed upon said exterior surface portions of said cylindrical wall sections, said screw sections having threads for ratcheting over said threads of said screw portions when said outer body member is pressed downwardly so as to telescopically receive said inner body member and for thereafter threadingly engaging said threads of said screw portions.

3. An insulation retainer as claimed in claim 2, wherein said retaining means comprises a finger formed integrally upon each one of said plurality of wing members and extending inwardly of said body portion for engaging the threads of said threaded stud.

4. An insulation retainer as claimed in claim 3, wherein said retaining means further comprises a pair of diametrically opposed rib members formed integrally upon the inner surface of said cylindrical wall sections and extending in a generally axial direction, the thickness of said rib members being selected so as to cause said wing members to be brought into engagement with the threads of said threaded stud as said retainer is pushed onto said threaded stud.

5. An insulation retainer as claimed in claim 1, further comprising means for preventing rotation of said outer body member relative to said inner body member when said retainer is unscrewed from the threaded stud.

6. An insulation retainer as claimed in claim 5, wherein said means for preventing rotation comprises an axially extending ridge formed upon the outer surface of said inner body member and a groove formed upon the inner surface of said shank portion for engaging said ridge.

7. An insulation retainer as claimed in claim 6, wherein:

said ridge includes an outwardly extending step functioning as a preset stop for engaging said outer body member so as to define a pre-driven position for said outer body member relative to said inner body member.

8. An insulation retainer as claimed in claim 1, further comprising:

projecting means formed upon said interior surface portion of said shank portion and engaging said upper end of said inner body member for initially limiting the inward movement of said inner body member relative to said outer body member so as to define a pre-driven position of said inner body member with respect to said outer body member.

9. An insulation retainer as claimed in claim 1, wherein said retainer is formed from a resilient plastic material.

10. An insulation retainer adapted for mounting upon threads of a threaded stud so as to retain insulation of various thicknesses upon a substrate to which said stud is secured, comprising:

an outer body member including a head portion and a shank portion;

said head portion being formed with a front surface and a back surface and having a central opening defined therein;

said shank portion extending axially from said back surface of said head portion and having an inner body receiving bore which is in communication with said central opening defined within said head portion;

an inner body member comprising a cylindrical body portion and having a threaded element receiving bore extending between an upper open end and a lower open end for housing said threaded stud, said inner body member being telescoped within said outer body member so that said threaded element receiving bore is disposed coaxially with respect to said inner body member receiving bore of said shank portion of said outer body member;

said cylindrical body portion of said inner body member having retaining means formed internally thereof for ratcheting over said threads of said threaded stud when said retainer is pressed onto said stud and for threadingly engaging said threads of said threaded stud when said threaded stud is disposed within said threaded element receiving bore of said cylindrical body portion of said inner body member;

adjustment means formed upon the interior surface of said outer body member and upon the exterior surface of said inner body member for permitting ratcheting of said outer body member over said inner body member in small increments so as to accommodate various thicknesses of insulation to be retained upon said substrate; and means for preventing rotation of said outer body member relative to said inner body member when said retainer is unscrewed from said threaded stud.

11. An insulation retainer as claimed in claim 10, wherein:
said adjustment means comprises partial thread screw sections formed upon said interior surface of said shank portion of said outer body member and partial screw thread portions formed upon said exterior surface of said inner body member, said screw sections having threads for ratcheting over said threads of said screw portions when said outer body member is pressed downwardly so as to telescopically receive said inner body member and for threadingly engaging said threads of said screw portions.

12. An insulation retainer as claimed in claim 19, further comprising:
projection means formed upon said interior surface of said shank portion of said outer body member and engaging said upper end of said inner body member for initially limiting the inward movement of said inner body member so as to define a pre-driven position of said inner body member with respect to said outer body member.

13. An insulation retainer as claimed in claim 10, wherein:
said means for preventing rotation comprises an axially extending ridge formed upon said outer surface of said inner body member and a groove formed upon said inner surface of said shank portion of said outer body member for engaging said ridge of said inner body member.

14. An insulation retainer as claimed in claim 13, wherein:
said ridge includes an outwardly extending step functioning as a preset stop for engaging said outer body member so as to define a pre-driven length of the outer body member relative to said inner member.

15. An insulation retainer adapted for mounting upon threads of a threaded stud so as to retain insulation of various thicknesses upon a substrate to which said stud is secured, comprising:
an outer body member including a head portion and a shank portion;
said head portion being formed with a front surface and a back surface, a central opening defined within said head portion, and two pair of recess means, disposed within planes mutually perpendicular with respect to each other and defined within peripheral regions of said front surface of said head portion, for receiving an operator's fingers for imparting rotation to said head portion and said outer body member when said retainer is to be threadedly removed from said threaded stud;
said shank portion extending axially from said back surface of said head portion and having an inner body receiving bore which is in communication with said central opening defined within said head portion of said outer body member;
an inner body member comprising a cylindrical body portion and having a threaded element receiving bore extending between an upper open end and a lower open end for housing said threaded stud, said inner body member being telescoped within said inner body receiving bore of said shank portion of said outer body member so that said threaded element receiving bore is disposed coaxially with respect to said inner body member receiving bore of said shank portion of said outer body member.
said cylindrical body portion of said inner body member having retaining means formed internally thereof for ratcheting over said threads of said threaded stud when said retainer is pressed onto said stud and for threadedly engaging said threads of said threaded stud when said threaded stud is disposed within said threaded element receiving bore of said cylindrical body portion of said inner body member; and
adjustment means formed upon the interior surface of said outer body member and upon the exterior surface of said inner body member for permitting ratcheting of said outer body member over said inner body member in small increments so as to accommodate various thicknesses of insulation to be retained upon said substrate.

16. An insulation retainer as set forth in claim 15, wherein:
said adjustment means formed upon said interior and exterior surface of said outer and inner body members comprise threaded portions which permit axial movement of said outer body member relative to said inner body member in a first axial direction while preventing axial movement of said outer body member relative to said inner body member in a second axial direction opposite to said first axial direction.

17. An insulation retainer as set forth in claim 15, further comprising:
means for preventing rotation of said outer body member relative to said inner body member when said retainer is threadedly disengaged from said threaded stud.

18. An insulation retainer as set forth in claim 17, wherein said rotation preventing means comprises:
an axially extending ridge formed upon an outer surface portion of said inner body member cylindrical body portion;
an axially extending groove formed upon an interior surface of said outer body member shank portion for accommodating said axially extending ridge of said inner body member.

19. An insulation retainer as set forth in claim 15, wherein:
said adjustment means comprises partial thread screw sections formed upon said interior surface of said outer body member and upon said exterior surface of said inner body member, said screw sections of said outer body member having threads for ratcheting over threads of said screw sections of said inner body members when said outer body member is pressed downwardly so as to telescopically receive said inner body member and threadingly engage said threads of said screw sections of said inner body member.

20. An insulation retainer as set forth in claim 15, wherein:
said retainer is formed from a resilient plastic material.

* * * * *